(12) United States Patent
Mai

(10) Patent No.: US 7,056,003 B2
(45) Date of Patent: Jun. 6, 2006

(54) BACKLIGHT MODULE

(75) Inventor: Che-Kuei Mai, Hsinchu (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 0 days.

(21) Appl. No.: 10/752,334

(22) Filed: Jan. 5, 2004

(65) Prior Publication Data

US 2004/0141307 A1    Jul. 22, 2004

(30) Foreign Application Priority Data

Jan. 6, 2003    (TW)    .............................. 92200124 U

(51) Int. Cl.
*F21V 7/04*    (2006.01)
(52) U.S. Cl. .......................... 362/609; 362/614; 349/65
(58) Field of Classification Search .................. 362/26, 362/27, 31, 260, 217, 241–249, 234, 297, 362/223–225, 326, 327, 608, 609, 610, 611, 362/614; 249/61–67, 70; 349/65, 67
See application file for complete search history.

(56) References Cited

U.S. PATENT DOCUMENTS

| | | | | |
|---|---|---|---|---|
| 5,202,950 A | * | 4/1993 | Arego et al. ................. | 385/146 |
| 5,560,698 A | * | 10/1996 | Okano .......................... | 362/31 |
| 5,890,796 A | * | 4/1999 | Marinelli et al. ............ | 362/307 |
| 5,997,148 A | * | 12/1999 | Ohkawa ....................... | 362/31 |
| 6,086,212 A | * | 7/2000 | Onishi et al. ................. | 362/31 |
| 6,305,813 B1 | * | 10/2001 | Lekson et al. ................ | 362/31 |
| 6,364,505 B1 | * | 4/2002 | Shoenfeld .................... | 362/241 |
| 6,447,135 B1 | * | 9/2002 | Wortman et al. ............. | 362/31 |
| 6,568,820 B1 | * | 5/2003 | Ohkawa et al. ............... | 362/31 |

* cited by examiner

*Primary Examiner*—Sandra O'Shea
*Assistant Examiner*—Hargobind S. Sawhney
(74) *Attorney, Agent, or Firm*—Liu & Liu

(57) ABSTRACT

A backlight module, suitable for supplying a plane light source. The backlight module has a light guide plate, a reflection mask and a light compensator. The light source is disposed next to a side surface of the light guide plate, such that the light generated thereby is incident on the side surface of the light guide plate, transmitted through the bottom surface, and projecting from the top surface of the light guide plate. The reflection mask is disposed next to the sidewall of the light guide plate to cover the light source. The light compensator is disposed in the reflection mask. By disposing the light compensator with multiple reflection planes in the reflection mask or forming multiple reflection surfaces of the reflection mask, the brightness at the two corners of the light guide plate near the two sides of the light source can be compensated.

20 Claims, 3 Drawing Sheets

BACKLIGHT MODULE

CROSS-REFERENCE TO RELATED APPLICATION

This application claims the priority benefit of Taiwan application serial no. 92200124, filed on Jan. 6, 2003.

BACKGROUND OF THE INVENTION

1. Field of the Invention

The invention relates in general to a backlight module, and more particularly, to a backlight module that effectively compensates brightness at two corners of a light guide plate near two sides of a light source.

2. Related Art of the Invention

The advancement of multi-media has benefited from the forward looking progress of semiconductor technique or human-machine interface display. For the .display, cathode ray tube (CRT) has dominated the markets for years due to its outstanding display quality and economics. However, the environment of operating desktop terminal/monitors and the trend of power saving with environment protection in mind have manifested the problems of cathode ray tube in terms of space utilization and power consumption. Therefore, the liquid crystal display (LCD) having the characteristics of being light, thin, short, small, and low power consuming has become main stream in the market. However, as the liquid crystal molecules are not luminescent materials, a backlight is required to provide the light source of the liquid crystal panel, so as to achieve the display effect with sufficient brightness and contrast.

FIG. 1 shows a top view of a conventional backlight module, and FIG. 2 shows a side view of the backlight module as shown in FIG. 1. Referring to FIGS. 1 and 2, the backlight module 100 includes a light guide plate 110, a light source 120, a reflection mask 130 and a frame 140. The light guide plate 110 includes a wedge light guide plate with a top surface 112, a bottom surface 114 and a side surface 116. The top surface 112 is designed as the projecting plane, the bottom surface 114 is used as the reflecting plane, while the side surface 116 is designed as the incident plane. The light source 120 such as a cold cathode fluorescent lamp (CCFL) is disposed next to the side surface 116 with two ends fixed on a lamp source holder 150. The light beam provided by the light source 120 is incident onto the side surface 116 of the light guide plate 116. Through the bottom surface 114, the light beam is transmitted to the top surface 112 of the light guide plate 110 and projects therefrom. Therefore, the light projecting from the top surface 112 is a plane light source. The reflection mask 130 is disposed next to the side surface 116 of the light guide plate 110 to cover the light source 120. The light beam provided by the light source 120 is thereby concentrated and incident on the side surface 116 of the light guide plate 110. The frame 140 is used to carry the light guide plate 110, the light source 120 and the reflection mask 140, such that the light guide plate 110, the light source 120 and the reflection mask 130 can be integrated into a single device.

As the cold cathode fluorescent lamp (CCFL) is currently typically used as the light source 120, the brightness of the high- and low-voltage regions at the two ends of the cold cathode fluorescent lamp is normally smaller than that of the middle thereof. Therefore, the brightness at the two corners of the light guide plate 110 near the two sides of the lamp 120 (regions A and B as illustrated in FIGS. 1) is insufficient. To overcome the problem, prior art increases the length of the lamp, such that the regions with insufficient brightness extend externally to the light guide plate. The brightness at the two corners of the light guide plate is thereby increased. However, the width of the liquid crystal display is consequently increased resulting in an enlarged size. This contradicts the trends for being light, thin, short and small.

SUMMARY OF THE INVENTION

The present invention provides a backlight module in which a light compensator is disposed in the reflection mask or multiple reflection planes are formed on the reflection mask. Thereby, the brightness at the two corners of the light guide plate near the two ends of the light source is compensated, while the requirement of minimizing the volume of the liquid crystal display is fulfilled.

The backlight module provided by the present invention is suitable for use as a plane light source. The backlight module comprises a light guide plate, a light source, a reflection mask and a light compensator. The light guide plate has a top surface, a bottom surface and at least one side surface. The light source is disposed next to the side surface of the light guide plate such that the light generated by the light source is incident on the side surface, transmitted from the bottom surface to the top surface, and projecting from the top surface. The reflection mask is disposed next to the side surface of the light guide plate to cover the light source. The light compensator is disposed in the reflection mask. The light compensator has multiple reflection planes facing the two ends of the light source, such that the brightness at the two corners near the two ends of the light source is compensated.

The present invention further provides a backlight module suitable for use as a plane light source. The backlight module comprises a light guide plate, a light source, and a reflection mask. The light guide plate has a top surface, a bottom surface and at least one side surface. The light source is disposed next to the side surface of the light guide plate such that the light generated by the light source is incident on the side surface, transmitted from the bottom surface to the top surface, projecting from the top surface. The reflection mask is disposed next to the side surface of the light guide plate to cover the light source. The reflection mask has multiple reflection planes facing the two ends of the light source, such that the brightness at the two corners near the two ends of the light source is compensated.

In one embodiment of the present invention, the light guide plate includes a wedge light guide plate. The bottom surface of the light guide plate preferably includes a step surface or a surface with multiple recesses to scatter the light provided by the light source. The light source includes, for example, a cold cathode fluorescent lamp.

The light compensator includes a first guide member and a second guide member. The first and second guide members are disposed in the reflection mask with first and second reflection surfaces, respectively. The first and second reflections faces the two ends of the light source to compensate the brightness at the two corners near the two ends of the light source. The first and second reflection surfaces preferably include step surfaces or multiple recesses.

According to one embodiment of the present invention, the light compensator includes a first reflection plate and a second reflection plate disposed in the reflection mask. The first and second reflection plates face two ends of the light source to compensate the brightness at the two corners near the two ends of the light source. In addition, the first and second reflection plates include step surfaces or multiple recesses thereon.

To enhance the irradiance of the backlight module, a diffusion sheet and a prism sheet are further incorporated. The diffusion sheet is disposed on the top surface of the light guide plate, and the prism sheet is disposed on the diffusion sheet. A framer is used to integrate the light guide plate, the light source, the reflection mask and the light compensator into a single unit.

According to the above, the present invention installs a light compensator in the reflection mask or forms multiple reflection surfaces directly on the reflection mask, such that the brightness at the two corners of the light guide plate near the two ends of the light source is enhanced. The light guide plate can thus provide a uniform plane light source, while the minimized volume of the liquid crystal display is maintained.

BRIEF DESCRIPTION OF THE DRAWINGS

These, as well as other features of the present invention, will become more apparent with reference to the drawings herein.

DETAILED DESCRIPTION OF THE PREFERRED EMBODIMENT

First Embodiment

Figure 1:
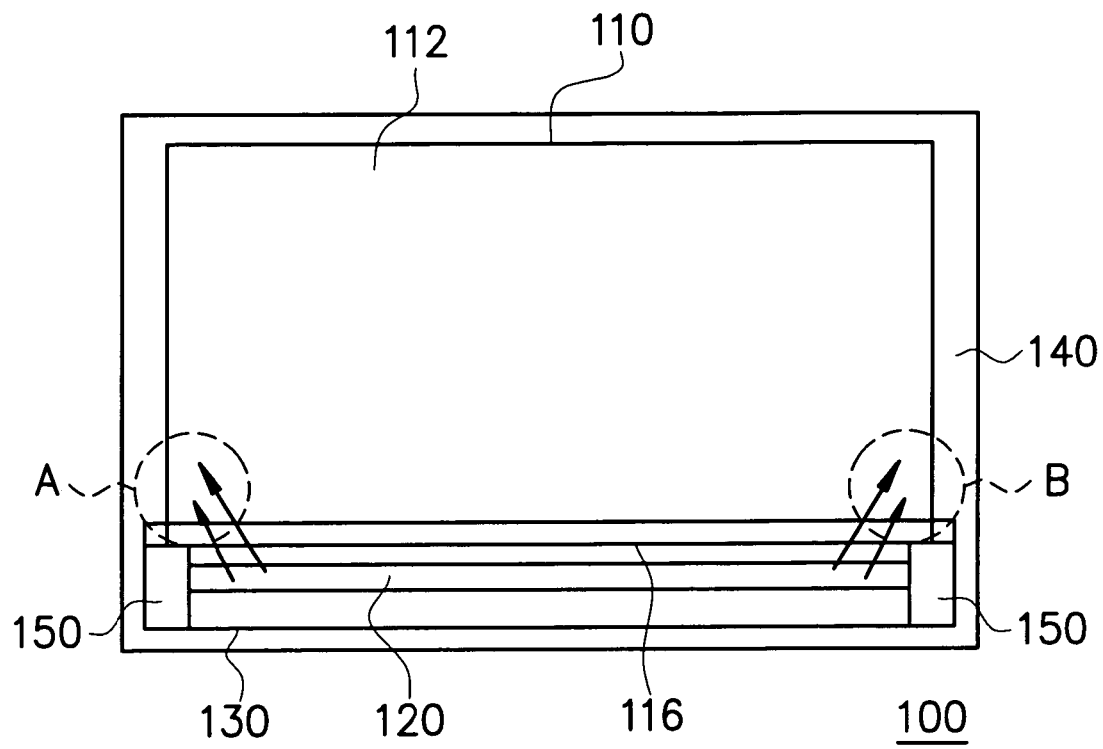
FIG. 1 shows a top view of a conventional backlight module.
Figure 2:
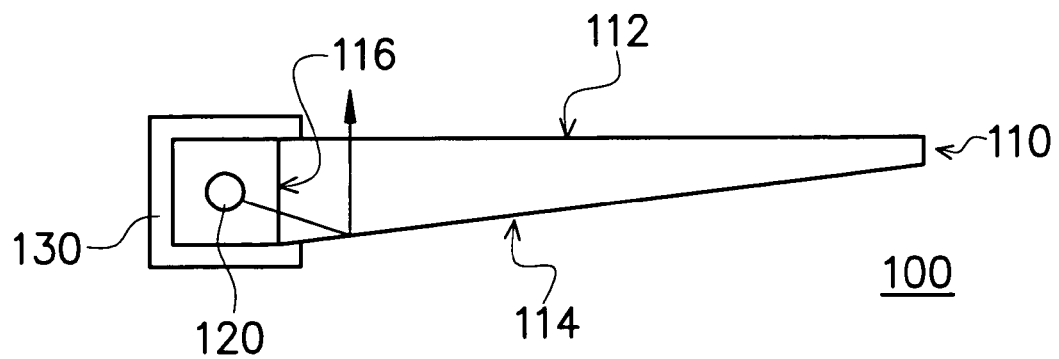
FIG. 2 shows a side view of the backlight module as shown in FIG. 1.
Figure 3:
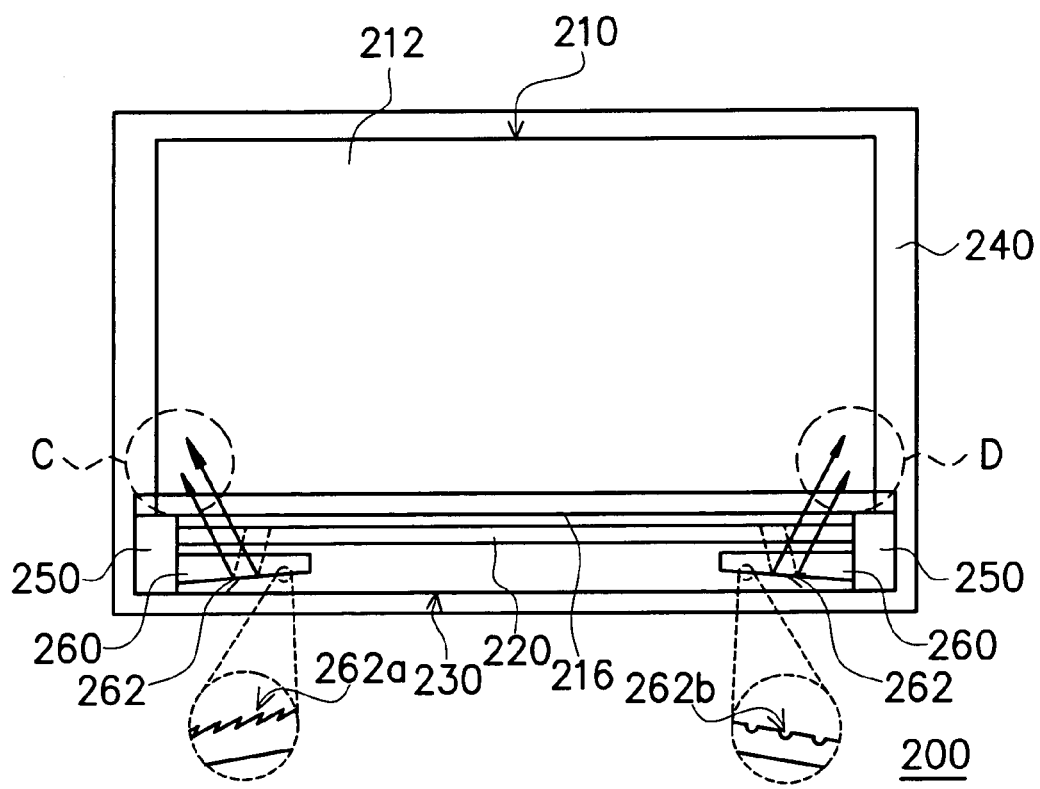
FIG. 3 shows a top view of a backlight module provided in a first embodiment of the present invention.
Figure 4:
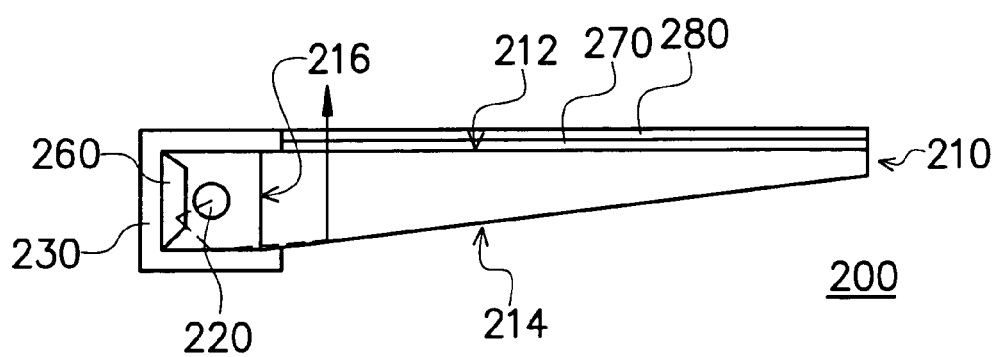
FIG. 4 shows a side view of the backlight module as shown in FIG. 3.

FIG. 3 shows a top view of a backlight module provided in the first embodiment, and FIG. 4 shows a side view of the backlight module. Referring to FIGS. 3 and 4, the backlight module 200 comprises a light guide plate 210, a light source 220, a reflection mask 230, a frame 240 and a light compensator 260. The light guide plate 210 is wedge-shaped preferably. For example, The light guide plate 210 has a top surface 212, a bottom surface 214 and a side surface 216. The top surface 212 is designed as a projecting plane, the bottom surface 214 is designed as a reflection plane, and the side surface 216 is designed as an incident plane. The bottom surface 214 includes a step surface or multiple recesses thereon, such that the light incident thereon is scattered and/or reflected.

The light source 220 includes a cold cathode fluorescent lamp, for example. The light source 220 is disposed next to the side surface 216 with the two ends fixed on a lamp holder 250. The light provided by the light source 220 is incident into the side surface 216 of the light guide plate 210, transmitted from the bottom surface 214 to the top surface 212, and projecting from the top surface 212. Therefore, the light projecting from the top surface 212 includes a plane light source.

The reflection mask 230 is disposed next to the side surface 216 to cover the light source 220. The light provided by the light source 220 is thus concentrated thereby to be incident on the side surface 216 of the light guide plate 210. In addition, to integrate the light guide plate 210, the light source 220, the reflection mask 230 and the light compensator 260 into a single unit, a frame 240 is used to carry the above devices.

To increase the irradiance of the backlight module 200, a diffusion sheet 270 and a prism sheet 280 are used. The diffusion sheet 270 is disposed on the top surface 212 of the light guide plate 210, and the prism sheet 280 is disposed on the diffusion sheet 270.

The present invention installs a light compensator 260 in the reflection mask 230. The light compensator 260 includes two guide members each having a reflection plane 262 facing the two ends of the light source 220, respectively. The reflection planes 262 include stepped surface 262a or multiple recesses 262b thereon to scatter the light provided by the light source 220. As the reflection planes 262 are facing the two ends of the light source 220, the light emitted from the middle part of the light source 220 is reflected or scatter towards two corners (regions C and D) of the light guide plate 210 near the two ends of the light source 220, so that the brightness at the two corners is compensated. Therefore, the plane light source provided from the top surface 212 of the light guide plate is made uniform. It is appreciated that the number of the guide members 262 is not limited to two, and the guide members 262 can be integrated into a single member with a length similar to that of the light source 220.

In addition, the light compensator can also be replaced with two reflection plates disposed in the reflection mask and facing the two ends of the light source. The reflection plate includes a step surface or multiple recesses thereon for scattering the incoming light, so as to compensate the brightness at the two corners of the light guide plate near the two ends of the light source.

Second Embodiment

Figure 5:
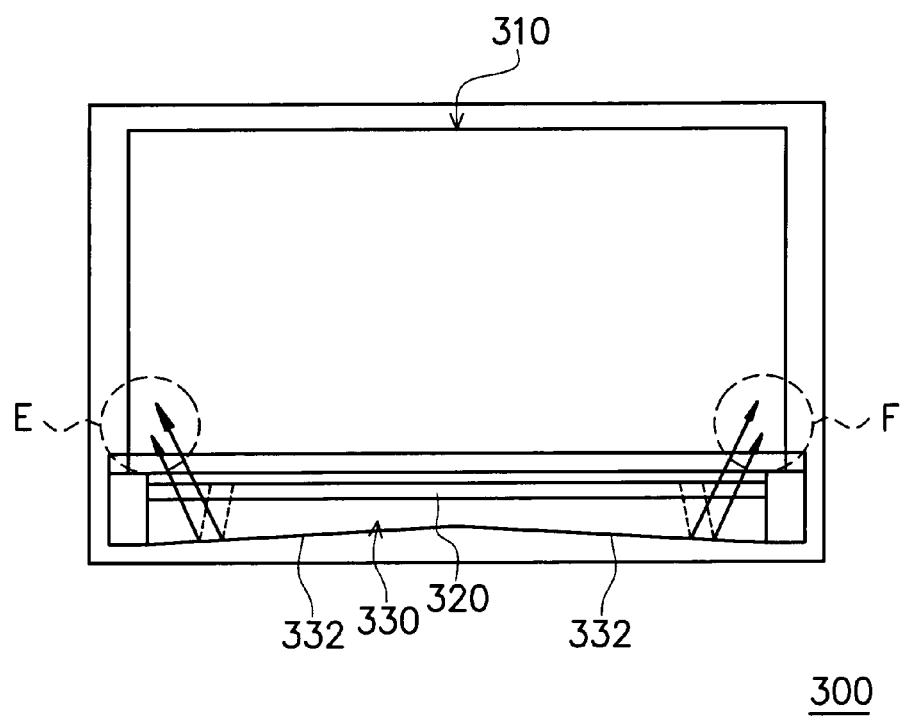
FIG. 5 shows a top view of a backlight module provided in a second embodiment of the present invention.

FIG. 5 shows the backlight module provided in a second embodiment of the present invention. Referring to FIG. 5, the overall structure of the backlight module 300 is similar to that provided in the first embodiment. The backlight module 300 differs from the backlight module 200 by forming a plurality of reflection planes 332 directly on the reflection mask 330. The reflection planes 332 face the two ends of the light source 320 with stepped surfaces or multiple recesses to scatter the incoming light provided by the light source. The brightness at the two corners of the light guide plate 310 (regions E and F) near the two ends of the light source 320 is thereby compensated.

According to the above, the present invention has at least the following advantages.

1. The backlight module compensates the brightness at the two corners of the light guide plate near the two ends of the light source, such that the top surface of the light guide plate provides a uniform plane light source.

2. In addition, to enhance the brightness at the two corners of the light guide plate near the two ends of the light source, the backlight module provided by the present invention does not increase the overall volume, such that the thin, light, short and small characteristics of liquid crystal display is retained.

Other embodiments of the invention will appear to those skilled in the art from consideration of the specification and practice of the invention disclosed herein. It is intended that the specification and examples are considered as exemplary only, with the true scope and spirit of the invention being indicated by the following claims.

What is claimed is:

1. A backlight module, suitable for supplying a plane light source, the backlight module comprising:
   a light guide plate, with a top surface, a bottom surface and at least one side surface;
   a light source, disposed next to the side surface of the light guide plate, the light source being operative to provide a light incident into the side surface, transmitted through the bottom surface, and projecting from the top surface;
   a reflection mask, disposed next to the side surface of the light guide plate, said reflection mask covers the light source; and
   a light compensator disposed in the reflection mask, wherein the light compensator has a plurality of reflection planes located near both ends of the light source respectively said reflection planes direct light towards two corners of the light guide plate to compensate brightness at the two corners of the light guide plate near the two ends of the light source.

2. The backlight module according to claim 1, wherein the light guide plate includes a wedge-shaped light guide plate.

3. The backlight module according to claim 1, wherein the light compensator comprises:
   a first guide member disposed in the reflection mask, the first guide member having a first reflection plane facing one end of the light source; and
   a second guide member disposed in the reflection mask, the second guide member having a second reflection plane facing the other end of the light source.

4. The backlight module according to claim 1, wherein the light compensator comprises:
   a first reflection plate disposed in the reflection mask and facing one end of the light source; and
   a second reflection plate disposed in the reflection mask and facing the other end of the light source.

5. The backlight module according to claim 4, wherein the first and second reflection planes each includes a stepped surface.

6. The backlight module according to claim 4, wherein the first and second reflection planes each includes a plurality of recesses thereon.

7. A backlight module, suitable for supplying a plane light source, the backlight module comprising:
   a light guide plate, with a top surface, a bottom surface and at least one side surface;
   a light source, disposed next to the side surface of the light guide plate, the light source being operative to provide a light incident onto the side surface, transmitted through the bottom surface, and projecting from the top surface; and
   a reflection mask, disposed next to the side surface of the light guide plate to cover the light source, wherein the reflection mask has a plurality of reflection planes longitudinally incline with respect to the light source, said reflection planes located near both ends of the light source respectively and direct light towards two corners of the light guide plate to compensate brightness at the two corners of the light guide plate near the two ends of the light source.

8. The backlight module according to claim 7, wherein the reflection planes each includes a stepped surface.

9. The backlight module according to claim 7, wherein the reflection planes each includes a plurality of recesses thereon.

10. A back light module, comprising:
    a light guide plate having a side surface with two ends;
    a light source provided adjacent the side surface, comprising a middle section, and two end sections adjacent to the two ends of the side surface;
    a reflection mask directing light emitted from the light source to the side surface, the reflection mask comprising a light compensation surface longitudinally inclined with respect to the light source, said compensation surface is positioned with respect to the side surface such that light emitted from the middle section is directed by the light compensation surface towards the end of the side surface of the light guide plate.

11. The light guide module as in claim 10, wherein the middle section of the light source extends longitudinally and parallel to the side surface.

12. The light guide module as in claim 11, wherein the reflection mask comprises at least two light compensation surfaces that are positioned with respect the side surface such that light emitted from the middle section is directed by both light compensation surfaces towards both ends of the side surface adjacent both end sections.

13. The light guide module as in claim 10, wherein the light compensation surface comprises a surface oriented with respect to the side surface to direct light from the middle section towards the end of the side surface.

14. The light guide module as in claim 13, wherein the reflection mask further comprises a reflective surface that is parallel to the side surface, directing light emitted from the middle section to the side surface, and wherein the light compensation surface is separate from the reflective surface.

15. The light guide module as in claim 13, wherein the light compensation surface also directs light emitted from the middle section towards other than the two ends of the side surface.

16. The light guide module as in claim 13, wherein the surface of the light compensation surface is inclined with respect to the side surface.

17. The light guide module as in claim 16, wherein the light source comprises a lamp extending longitudinally, wherein the non-light emitting section comprises a lamp holder.

18. The light guide module as in claim 10, wherein light emitted by the end sections of the light source is not as bright as the light emitted by the middle section of the light source.

19. The light guide module as in claim 10, wherein the middle section of the light source extends longitudinally and parallel to the side surface, and at least one of the end sections include a non-light emitting section having a portion that is adjacent to the end of the side surface.

20. The light guide module as in claim 10, wherein the light guide plate comprises a planar light emitting surface, and the light guide module further comprising at least one of a diffusion sheet or prism sheet adjacent the light guide plate.

* * * * *